United States Patent [19]

Yokoyama

[11] 4,334,249

[45] Jun. 8, 1982

[54] APPARATUS FOR USE IN RECORDING A PULSE SIGNAL ON A MAGNETIC RECORDING MEDIUM

[75] Inventor: Eiichi Yokoyama, Machida, Japan

[73] Assignee: Sony Corporation, Tokyo, Japan

[21] Appl. No.: 107,355

[22] Filed: Dec. 26, 1979

[30] Foreign Application Priority Data

Dec. 28, 1978 [JP] Japan ............................... 53-165180

[51] Int. Cl.³ ........................ G11B 5/04; G11B 15/02
[52] U.S. Cl. ........................................ 360/30; 360/25
[58] Field of Search ........................ 360/29, 30, 25, 68

[56] References Cited

U.S. PATENT DOCUMENTS 4,077,046 2/1978 Morio ..................................... 360/29
4,115,820 9/1978 Morio et al. .......................... 360/30

Primary Examiner—Vincent P. Canney

Attorney, Agent, or Firm—Lewis H. Eslinger; Alvin Sinderbrand

[57] ABSTRACT

Apparatus is described which is particularly useful for recording pulse signals on a magnetic recording medium. The apparatus includes an amplitude modulator, preferably a balanced modulator, that is supplied with the pulse signal and with a carrier upon which the pulse signal is amplitude-modulated. The pulse signal has gradually rising and falling edges which exhibit a maximum gradient. The modulated carrier is substantially fully suppressed when the maximum gradient of the pulse signal traverses a predetermined level. Preferably, the modulation factor of the amplitude modulator is greater than unity. When used with additional recording apparatus, the balanced modulated signal is filtered by a vestigial sideband filter, and the filtered, balanced modulated signal is frequency-converted to a lower frequency band. The frequency-converted balanced modulated signal is superimposed with an AC bias signal and then recorded.

15 Claims, 10 Drawing Figures

APPARATUS FOR USE IN RECORDING A PULSE SIGNAL ON A MAGNETIC RECORDING MEDIUM

BACKGROUND OF THE INVENTION

This invention relates to an apparatus for magnetically recording a pulse signal and, more particularly, to such apparatus wherein the pulse signal is a suppressed-carrier balanced modulated signal which, upon recording and reproducing, exhibits an improved error characteristic.

In many applications, information, such as audio information, alpha-numeric information, and the like, is represented by pulse signals, and these pulse signals are recorded on a magnetic recording medium. For example, it is known that a video tape recorder (VTR) can be used to record such information-representing pulse signals on magnetic videotape. Typically, the information is encoded as a pulse coded signal, such as by pulse code modulation (PCM), and this pulse coded signal is recorded.

Various techniques are used to record pulse signals on magnetic tape. In one technique, a carrier is frequency modulated with the pulse signal, and then this FM signal is recorded. In another type of recording technique, the pulse signals are recorded directly by the so-called direct saturation method. This direct saturation method is used primarily in mass storage systems, such as digital storage systems.

When either the FM recording or direct saturation recording techniques are used, modulation noise has a deleterious influence on the reproduced signals. Also, the error characteristic of the recorded and reproduced signals is deteriorated if the signal-to-noise (S/N) ratio deteriorates. On reproducing the FM or direct saturation pulse signals, the error rate in the reproduced signals may be undesirably high.

In one method of reproducing a pulse signal, the rising and falling (or leading and trailing) edges of each recorded pulse are reproduced, generally as differentiated pulses. The presence of such differentiated pulses may be detected by comparing the reproduced signal to one or more predetermined reference levels. When these reference levels are traversed by the differentiated pulses associated with the pulse signal (i.e. the rising and falling edges), the original leading and trailing edges of that pulse signal can be recovered. Then, from these recovered leading and trailing edges, the original pulse signal can be reproduced. However, it is known that, in many tape recording systems, such as in many VTR's there is an inherent distortion factor associated with higher frequencies, these higher frequencies typically being within the range encompassed by the third harmonic of the pulse coded signal. Because of this distortion factor, the differentiated pulses which represent the rising and falling edges of the pulse signal appear to be shifted in the time axis (or time base) direction. Such a time shift erroneously interferes with the sensing and reproduction of the original pulse signal. That is, because of this time shift, a differentiated rising edge pulse may be detected at a time location whereat the original pulse signal exhibits a falling edge. Hence, the resultant sensing of the original pulse signal will be incorrect. Thus, the error characteristic in reproducing pulse coded signals suffers deterioration because of this third harmonic distortion factor.

OBJECTS OF THE INVENTION

Therefore, it is an object of the present invention to provide improved apparatus which is used for magnetically recording a pulse signal wherein the aforenoted disadvantages and difficulties are avoided.

Another object of this invention is to provide an apparatus for recording a pulse signal in which the pulse signal is amplitude modulated onto a carrier.

A further object of this invention is to provide pulse signal recording apparatus in which the signal is balanced modulated onto a carrier and the carrier is suppressed, to reduce the deleterious influence of modulation noise.

An additional object of this invention is to provide pulse signal recording apparatus in which a suppressed-carrier balanced modulated signal is frequency-converted to a relatively low frequency range so as to reduce the deleterious influence which otherwise may be present due to the inherent third harmonic distortion factor of the recording apparatus.

Yet another object of this invention is to provide magnetic recording apparatus for a pulse signal wherein the recorded pulse signal subsequently can be reproduced with minimal error.

Various other objects, advantages and features of the present invention will become readily apparent from the ensuing detailed description, and the novel features will be particularly pointed out in the appended claims.

SUMMARY OF THE INVENTION

In accordance with one aspect of this invention, an amplitude modulator is provided for use in signal recording apparatus. The amplitude modulator, which may be a balanced modulator, is supplied with a pulse signal having gradually rising and falling edges which exhibit a maximum gradient, and also with a carrier signal. The carrier signal is amplitude-modulated with the pulse signal, and this carrier is substantially fully suppressed when the maximum gradient of the pulse signal traverses a predetermined level. When used with other recording apparatus, the modulated carrier is filtered by a vestigial sideband filter so as to produce a suppressed-carrier balanced modulated signal. This suppressed-carrier balanced modulated signal is frequency-converted to a relatively lower frequency range, and the frequency-converted signal is superimposed with an AC bias signal and then recorded.

Advantageously, the balanced modulated signal is effective to reduce undesired modulation noise; and by frequency converting this signal to a relatively lower frequency range, deleterious influence of the inherent third harmonic distortion factor of the recording apparatus is reduced.

To reproduce the frequency-converted suppressed-carrier balanced modulated signal, this signal is played back by a suitable transducer, frequency re-converted back to its original frequency band, and then detected, as by a multiplier, to recover the original pulse signal.

BRIEF DESCRIPTION OF THE DRAWINGS

The following detailed description, given by way of example, will best be understood in conjunction with the accompanying drawings in which.

DETAILED DESCRIPTION OF A PREFERRED EMBODIMENT

Figure 1:
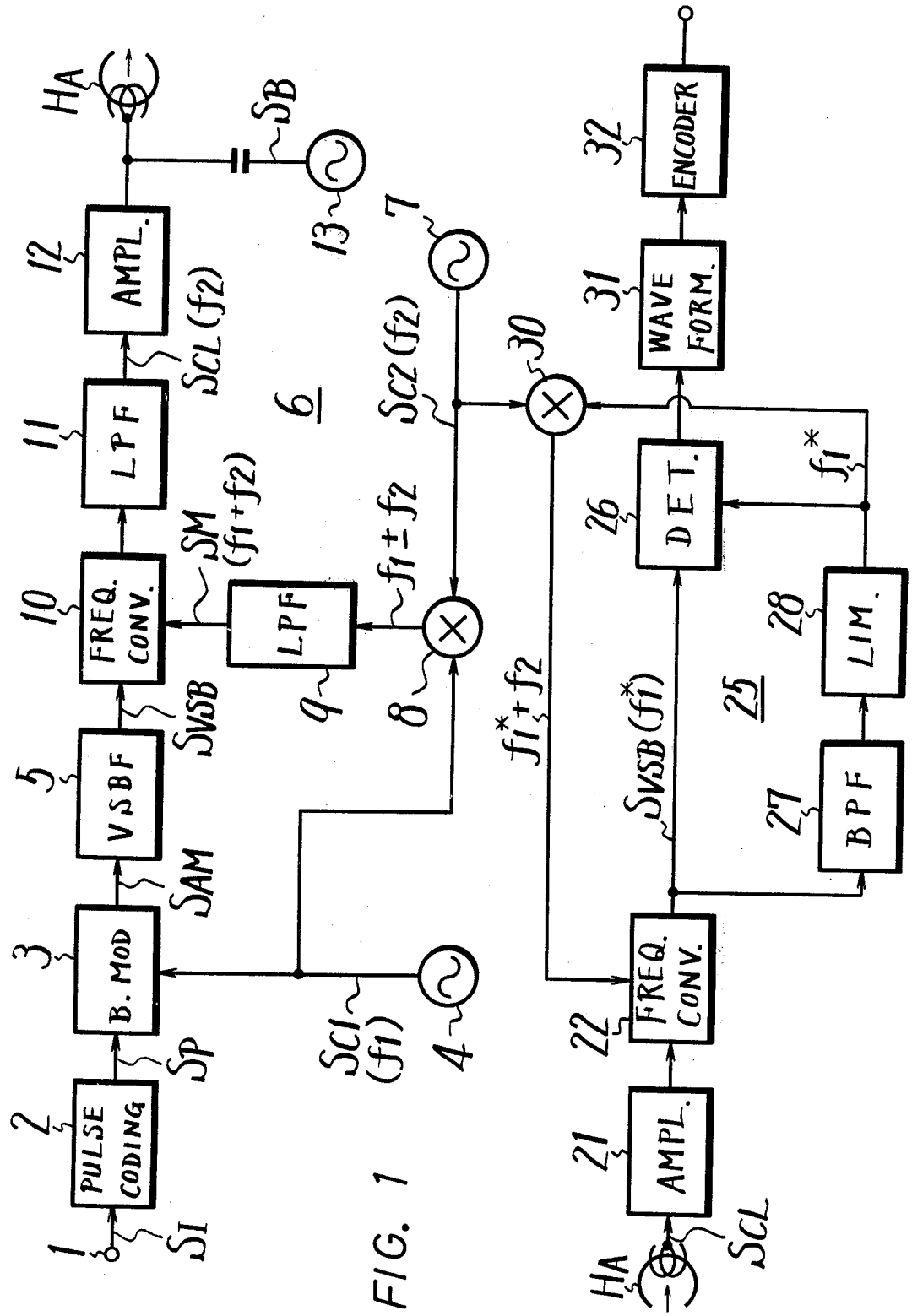
FIG. 1 is a block diagram representing one embodiment of recording apparatus in accordance with the present invention and, also, one embodiment of reproducing apparatus which can be used therewith.

Referring now to FIG. 1, there is illustrated a block diagram of one embodiment of signal recording apparatus in which the present invention finds ready application. The illustrated apparatus includes a pulse encoder 2, a balanced modulator 3, a vestigial sideband filter 5, a frequency converter 10, and a recording transducer, or head, $H_A$. Pulse encoder 2 is coupled to an input terminal 1 and is adapted to receive an information $S_I$, such as an audio signal or other signal which is to be recorded on a magnetic recording medium. Pulse encoder 2 is further adapted to generate a pulse coded signal $S_P$ which represents the information signal $S_I$. This pulse coded signal may, for example, comprise a pulse code modulation (PCM) signal or the like.

The output of pulse encoder 2 is connected to the input of balanced modulator 3. As is known, a balanced modulator is a type of amplitude modulator, and balanced modulator 3 is adapted to amplitude modulate a carrier signal $S_{C1}$ of carrier frequency $f_1$ with the pulse coded signal $S_P$. In this regard, balanced modulator 3 is connected to a source 4 of carrier signal $S_{C1}$. Since the balanced modulator is a conventional circuit, further description thereof is not provided. As is understood by those of ordinary skill in the art, one advantage of using a balanced modulator is that upper and lower sidebands are produced but an unmodulated carrier component $S_{C1}$ is suppressed. Additional explanation of balanced modulator 3 is set out below.

Balanced modulator 3 is adapted to produce an amplitude modulated signal $S_{AM}$, with the amplitude modulations corresponding to the pulse coded signal $S_P$. This signal $S_{AM}$ is referred to herein as a balanced modulated AM signal. The output of this balanced modulator is connected to vestigial sideband filter 5. This vestigial sideband filter is of conventional construction and exhibits a roll-off frequency characteristic so as to pass substantially the entirety of the lower sideband of the balanced modulated AM signal $S_{AM}$ and only a small portion of the upper sideband of the modulated signal. As will be shown below, the roll-off frequency characteristic of this vestigial sideband filter is of negative slope having a level about 6 dB above its zero reference level at a frequency equal to that of carrier signal $S_{C1}$. Thus, if balanced modulator 3 had not suppressed the carrier signal $S_{C1}$, this carrier signal would be suppressed, at least to some degree, by the roll-off frequency characteristic of vestigial sideband filter 5.

The output of this vestigial sideband filter, which is a filtered amplitude modulated signal $S_{VSB}$, is supplied to frequency converter 10. The frequency converter is a mixing circuit which is adapted to heterodyne the filtered AM signal $S_{VSB}$ with a conversion carrier $S_M$. This conversion carrier has a frequency $(f_1+f_2)$ derived from the carrier frequency $f_1$ of carrier signal $S_{C1}$ generated by source 4 and the frequency $f_2$ of an oscillating signal $S_{C2}$ generated by a source 7. More particularly, sources 4 and 7 are connected to another mixing circuit 8, this mixing circuit being adapted to heterodyne carrier signal $S_{C1}$ and oscillating signal $S_{C2}$. As a result of this heterodyning, upper and lower sideband signals are produced, the upper sideband having a frequency equal to the sum of these frequencies $(f_1+f_2)$, and the lower sideband having a frequency equal to the difference between these frequencies $(f_1-f_2)$. A filter 9 is connected between mixing circuit 8 and frequency converter 10 and is adapted to pass the upper sideband signal which is supplied as the conversion carrier $S_M$ frequency $f_1+f_2$.

As mentioned above, frequency converter 10 is adapted to heterodyne the filtered, amplitude modulated signal $S_{VSB}$ and the conversion carrier $S_M$. As a result of this heterodyning, lower and higher frequency sidebands of the amplitude modulated signal are produced. The output of frequency converter 10 is connected to a low pass filter 11 which serves to select the lower sideband of the heterodyned signal. Thus, the amplitude modulated signal is, effectively, down-converted to a frequency range which is lower than that which it originally occupied at the output of vestigial sideband filter 5. This lower band frequency-converted AM signal $S_{CL}$ exhibits a frequency-converted carrier frequency $f_2$ and is supplied via an amplifier 12, to recording transducer $H_A$ for recording on a magnetic medium, such as magnetic tape (not shown). In addition, an AC bias signal $S_B$, generated by a source 13, is superimposed onto this frequency-converted AM signal, and the superimposed signals are recorded by transducer $H_A$.

Figure 2A:
FIGS. 2A–2F are waveform diagrams which are useful in understanding the operation of the present invention.

The operation of the apparatus thus far described now will be explained, with reference to the waveforms shown in FIGS. 2A–2F and also with reference to the frequency spectra shown in FIGS. 3A–3C. Let it be assumed that the pulse coded signal $S_P$ which is supplied to balanced modulator 3 is as shown in FIG. 2A. Although an ideal pulse signal exhibits a substantially zero rise time and fall time, an actual pulse signal exhibits finite rise and fall times. For convenience, these rise and fall times are exaggerated in FIG. 2A. Nevertheless, it is appreciated that the pulse signal $S_P$ exhibits gradually rising and gradually falling edges. These also are referred to herein as the leading and trailing edges. It is seen that such rising and falling edges exhibit a maximum gradient. That is, if the pulse signal $S_P$ is differentiated, the level of the differentiated signal which is the gradient, will be a maximum at the rising and falling edges of the signal.

It is advantageous to utilize balanced modulation in modulating the carrier signal $S_{C1}$ with a pulse signal $S_P$. This is because balanced modulation serves to suppress the carrier. That is, the unmodulated carrier component is not substantially produced at the output of a balanced modulator. Since modulation noise in a magnetic recording system is dependent upon the carrier level, the inherent carrier suppression of a balanced modulator results in reduction of this modulation noise.

Figure 2B:
Figure 2C:
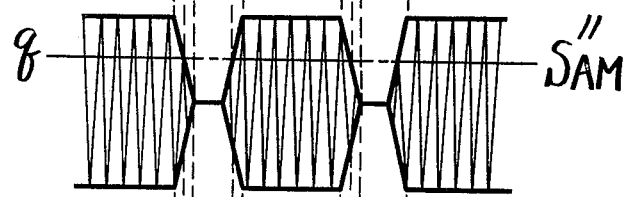
Figure 3A:
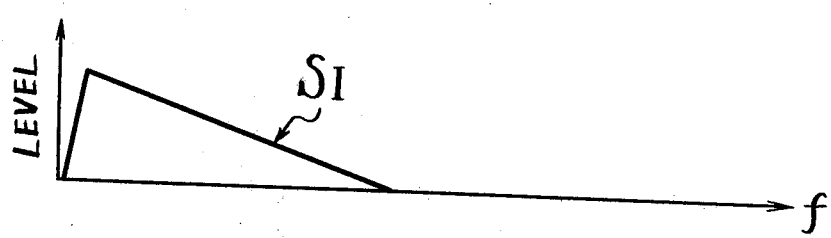
FIGS. 3A–3C represent the frequency spectra of the signals which are processed by the various elements used in this invention.
Figure 3B:
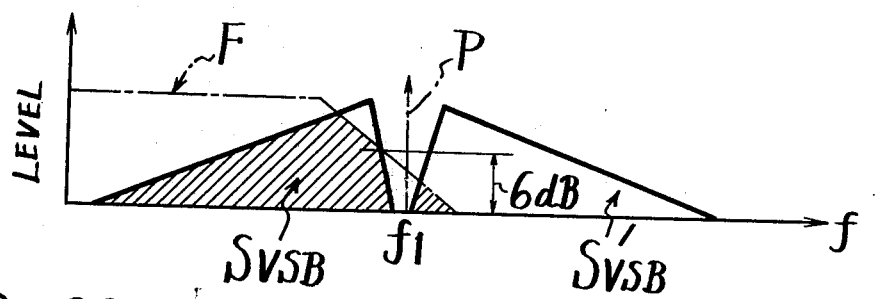
Figure 3C:
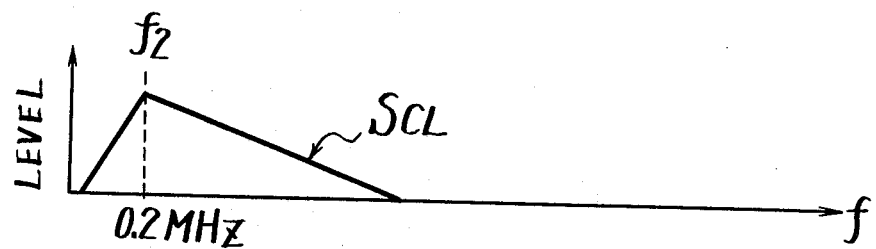

Ordinary balanced modulation of the carrier by the pulse signal $S_P$ results in a balanced modulated AM signal $S'_{AM}$ of the type shown in FIG. 2B. If the pulse signal is used to "deeply" modulate the carrier signal, such as if the modulation factor is equal to unity, the resultant balanced modulated AM signal will appear as shown by signal $S''_{AM}$ of FIG. 2C. In FIG. 2B the carrier is suppressed at the base level of the pulse signal $S_P$, and in FIG. 2C, the carrier is suppressed at the peak level of the pulse signal. However, in both FIGS. 2B and 2C, that is, for both ordinary and deep amplitude modulation, the carrier signal is present at the predetermined level q when the pulse signal $S_P$ traverses this level.

The significance of this predetermined level q now will be explained. When a pulse code signal is to be recovered, or detected, it is not uncommon to sense the rising and falling edges thereof, such as by differentiating the pulse signal. The presence of the rising and falling edges is determined by comparing these differentiated pulse signals with the predetermined level q. If the differentiated pulse signal exceeds this level q, the rising edge of the pulse signal is present. If the level q is of negative polarity, and this negative level is exceeded by the differentiated pulse, then the falling edge thereof is present. Alternatively, if the differentiated pulse signal is supplied through a full-wave rectifier for comparison with the level q, then each time that this level is exceeded by the full-wave rectified differentiated pulse signal, a rising or falling edge is detected.

From the foregoing, it is appreciated that it is important that the amplitude modulated pulse signal be substantially free of distortion at each point that this signal traverses the level q. Stated otherwise, the maximum gradient of the amplitude modulated pulse signal should exhibit no distortion when it traverses level q. However, for ordinary amplitude modulation (FIG. 2B) and for deep amplitude modulation (FIG. 2C), it is seen that the carrier signal is present each time that the maximum gradient of the pulse signal $S_P$ traverses level q. Since the carrier signal is not fully suppressed at these traversals, modulation noise may be present, and such noise may interfere with correct discrimination of the rising and falling edges. That is, because of such modulation noise, an actual traversal of the level q may be "missed." Alternatively, even if the pulse signal does not traverse this level, the presence of modulation noise may, erroneously, be detected as a false traversal. Thus, it is necessary that, in order to minimize this modulation noise, the modulated carrier be substantially fully suppressed at each crossing of level q by the rising and falling edges of the modulated pulse signal. Stated otherwise, the carrier should be substantially fully suppressed at each traversal of the level q by the maximum gradient of the pulse signal.

This desirable feature is attained by selecting an appropriate modulation factor for balanced modulator 3. This modulation factor, which preferably is greater than unity, results in the amplitude modulated signal $S_{AM}$ shown in FIG. 2D. It is seen that, where each rising and falling edge of the pulse signal traverses level q, the carrier is substantially fully suppressed. Thus, modulation noise is greatly reduced at these points so as to improve the signal-to-noise (S/N) ratio. By minimizing such modulation noise, the maximum gradients of the pulse signal can be detected correctly so as to sense accurately the rising and falling edges of the pulse signal.

It may be appreciated that the predetermined level q may be a mid-level that is substantially half-way between the base and maximum peak levels of the pulse signal $S_P$ (FIG. 2A).

If the pulse signal $S_P$ is to be recorded by VTR apparatus, then this pulse signal must be provided with pseudo horizontal synchronizing pulses $P_H$. Such a compound signal comprised of the pulse signal $S_P$ and pseudo horizontal synchronizing pulses $P_H$ is illustrated in FIG. 2E. When this compound signal is balance modulated in balanced modulator 3, the resultant suppressed-carrier balanced modulated AM signal $S_{AM}$ appears as shown in FIG. 2F. It is seen that, in FIG. 2F, the carrier of the AM signal is substantially fully suppressed at the level q when this level is traversed by the maximum gradients of the pulse signal.

Figure 2D:
Figure 2E:
Figure 2F:
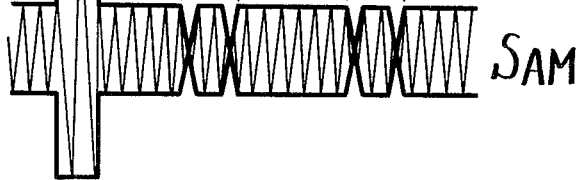

The suppressed-carrier balanced modulated signal $S_{AM}$, such as shown in FIGS. 2D or 2F, is filtered by vestigial sideband filter 5. Let it be assumed that the amplitude modulated pulse signal represents audio information. Let it be further assumed that the frequency spectrum of the audio information signal $S_I$ is as shown in FIG. 3A. The frequency spectrum of the upper and lower sidebands of the suppressed-carrier balanced modulated AM signal is represented by the solid lines shown in FIG. 3B. It should be pointed out that the illustrated spectra relates to the analogue audio signal and not to the pulse coded audio signal. It is appreciated that, in view of the higher order harmonics which are included in a pulse signal, the actual frequency spectrum for the balanced modulated pulse coded signal would differ somewhat from that shown in FIG. 3B. Nevertheless, in the interest of simplification, and in order to fully understand the advantages of the present invention, FIG. 3B represents the upper and lower sidebands which would be associated with the analogue audio signal.

As shown by the broken line, the carrier signal (shown as P in FIG. 3B) is suppressed by balanced modulator 3. Thus, the balanced modulator produces an upper sideband of the suppressed-carrier balanced modulated AM signal as well as a lower sideband of the suppressed-carrier balanced modulated AM signal, while suppressing the carrier (P). These upper and lower sidebands are supplied to vestigial sideband filter 5. The frequency characteristic of the vestigial sideband filter is shown by broken curve F in FIG. 3B. It is seen that substantially all of the lower sideband of the suppressed-carrier balanced modulated AM signal is passed by vestigial sideband filter 5, and only a relatively small portion of the upper sideband is passed. Moreover, the pass-band frequency characteristic F exhibits a level of about +6 dB at a frequency equal to that of the carrier. The cross-hatching shown in FIG. 3B represents that portion of the suppressed-carrier balanced modulated signal which is passed by vestigial sideband filter 5. It is appreciated that this filter serves to limit the suppressed-carrier balanced modulated signal to not substantially more than a single sideband. That portion of the suppressed-carrier balanced modulated signal which is passed, or transmitted, by vestigial sideband filter 5 is designated $S_{VSB}$, and that portion of the signal which is blocked is designated $S'_{VSB}$.

The filtered suppressed-carrier balanced modulated AM signal $S_{VSB}$ is frequency-converted to a lower frequency range by frequency converter 10. As mentioned above, the conversion carrier $S_M$ exhibits a frequency $f_1+f_2$, wherein the frequency $f_1$ is the carrier frequency of the filtered suppressed-carrier balanced modulated AM signal. The frequency $f_2$ is selected to be about 0.2 to 0.3 MHz so as to ensure that the frequency-converted signal will be shifted to a relatively low frequency band. Moreover, the carrier frequency $f_1$ must be much greater than $f_2$ ($f_1 > > f_2$).

As mentioned above, frequency converter 10 may comprise a mixing circuit to heterodyne the filtered suppressed-carrier balanced modulator AM signal $S_{VSB}$ with the conversion carrier $S_M$. Low pass filter 11 selects the lower sideband of these heterodyned signals so as to transmit the lower sideband frequency-converted suppressed-carrier balanced modulated AM signal $S_{CL}$ of frequency $f_2$. The frequency spectrum of this frequency-converted signal is as shown in FIG. 3C. This signal $S_{CL}$ is amplified and superimposed with the AC bias signal $S_B$ for recording on magnetic tape by transducer $H_A$.

In a typical VTR, the frequency-response characteristics thereof and particularly of the magnetic medium, are generally linear up to a frequency of about 1 MHz. The frequency-converted signal $S_{CL}$, having the frequency spectrum shown in FIG. 3C, is generally within this linear frequency-response range. Hence, the frequency-converted signal $S_{CL}$ and the superimposed AC bias signal can be recorded in the substantially linear region of the magnetic medium. By recording the signal in this linear region with the superimposed AC bias signal, the aforenoted disadvantages due to third harmonic distortion are drastically reduced. Moreover, since the converted carrier frequency $f_2$ of the frequency-converted signal $S_{CL}$ is well within the linear region of the frequency-response characteristic of the recording medium, the modulated signals in the vicinity of this carrier will be recorded in the peak region of this frequency-response characteristic. Consequently, the signal-to-noise (S/N) ratio is further improved; and undesired influence due to tape jitter can be suppressed easily. Still further, since a modulation factor that is greater than unity widens the dynamic range of balanced modulator 3, substantially full use of the linear portion of the frequency-response characteristic of the magnetic medium is obtained by selecting such a modulation factor.

Returning now to FIG. 1, and particularly the lower half of this figure, a reproducing section which is compatible with the aforedescribed recording apparatus is illustrated This reproducing section is comprised of a frequency re-converter 22, an AM detector 25, and a decoder 32. Frequency re-converter 22 is adapted to frequency re-convert the reproduced lower frequency signal $S_{CL}$ back to its original frequency band. Accordingly, the frequency re-converter is connected to a reproducing transducer, or head, by an amplifier 21. The reproducing transducer is illustrated as head $H_A$. It is appreciated that the very same transducer can be used both for recording and reproducing purposes. This head reproduces the frequency-converted suppressed-carrier balanced modulated AM signal $S_{CL}$; and this reproduced signal is amplified and supplied to frequency re-converter 22. A re-converting signal of frequency $f^*_1 + f_2$ is supplied to the frequency re-converter.

The output of frequency re-converter 22, from which the frequency re-converted signal $S_{VSB}$ is provided, is connected to AM detector 25. This AM detector is comprised of a synchronous detector and includes a multiplier 26 which is supplied with the frequency re-converted signal $S_{VSB}$ and a detecting carrier of frequency $f^*_1$. This carrier is derived from the frequency re-converted suppressed-carrier balanced modulated signal $S_{VSB}$ by a band pass filter 27 and a limiter 28. The band pass filter is adapted to pass those frequency components of the signal $S_{VSB}$ within the vicinity of frequency $f^*_1$, and limiter 28 is adapted to eliminate amplitude modulations in the filtered frequency components. This derived carrier of frequency $f^*_1$, in addition to being supplied to the multiplier 26, is supplied to a mixing circuit 30. The mixing circuit also is supplied with oscillating signal $S_{C2}$ of frequency $f_2$ and is adapted to heterodyne the signals supplied thereto to apply a re-converting carrier of frequency $f^*_1 + f_2$ to frequency re-converter 22.

The output of multiplier 26, which is the detected pulse coded signal, is supplied to decoder 32 via a wave shaper 31. Decoder 32 is adapted to recover the original information signal $S_I$, such as the audio signal or other information signal, which had been supplied to pulse encoder 2 from input terminal 1.

In operation, let it be assumed that, because of tape jitter, or other factors, the carrier frequency $f_2$ in the reproduced signal $S_{CL}$ undergoes frequency variations. When this reproduced signal is heterodyned with the re-converting signal, the frequency re-converted signal $S_{VSB}$ produced by frequency re-converter 22 also exhibits carrier frequency variations; and these carrier frequency variations are represented as $f^*_1$. Band pass filter 27 and limiter 28 serve to extract the carrier frequency $f^*_1$ from the frequency re-converted signal $S_{VSB}$. If desired, band pass filter 27 may be constituted by a band pass amplifier or the like. The carrier of frequency $f^*_1$, derived from limiter 28, is heterodyned with the oscillating signal $S_{C2}$ of frequency $f_2$ in mixing circuit 30. For the purpose of describing the reproducing section of the illustrated apparatus, oscillating signal $S_{C2}$ may be thought of as a re-converting carrier supplied by source 7. The upper sideband of the heterodyned frequencies $f^*_1 + f_2$ is supplied to frequency re-converter 22. Thus, it is appreciated that the frequency variations which may be present in the reproduced signal $S_{CL}$ also are present in the frequency re-converted signal $S_{VSB}$, and also are present in the carrier frequency $f^*_1$ which is derived from this frequency re-converted signal. Since this derived carrier frequency is substantially equal to and in phase with the frequency re-converted carrier, multiplier 26 operates to synchronously detect the amplitude modulated pulse signal. This detected pulse signal is suitably shaped by wave shaper 31 and decoded by decoder 32.

It is appreciated that vestigial sideband filter 5 produces asymmetrical upper and lower sidebands. These asymmetrical sidebands may produce distortion in the reproduced signal. To avoid this possibility, a transversal filter, or the like, having a transfer function that is complementary to that of vestigial sideband filter 5, may be connected to the input of balanced modulator 3. By supplying the pulse coded signal $S_P$ through this transversal filter prior to being balanced modulated, the distortion which may be due to the asymmetrical sidebands from vestigial sideband filter 5 is compensated.

While the present invention has been particularly shown and described with reference to a particular preferred embodiment, it should be readily apparent to those of ordinary skill in the art that various changes and modifications in form and details may be made without departing from the spirit and scope of the invention. For example, the recording medium upon which the frequency-converted, suppressed-carrier balanced modulated AM signal is recorded need not be limited solely to magnetic tape. Other forms of magnetic recording media, such as a magnetic sheet, disc, drum or the like may be used. It is intended that the appended claims be interpreted as including various other changes and modifications.

What is claimed is:
1. In apparatus for recording pulse signals on a magnetic recording medium, said pulse signals having gradually rising and falling edges between at least first and second information levels, said rising and falling edges exhibiting a gradient, which edges traverse a predetermined level, modulating means for modulating the amplitude of a carrier signal with said pulse signals to produce a modulated signal for recording and comprising amplitude modulating means supplied with said carrier signal and with said pulse signals, said amplitude modulating means having a modulation factor such that the modulated carrier signal is substantially suppressed at said predetermined level when traversed by said rising and falling edges but not at said at least first and second information levels.

2. The apparatus of claim 1 wherein said amplitude modulating means comprises a balanced modulator for producing a suppressed carrier balanced amplitude-modulated signal.

3. The apparatus of claim 2 wherein the modulation factor of said balanced modulator is greater than unity.

4. Apparatus for recording a pulse signal having at least two information levels on a magnetic recording medium, comprising a source of carrier signal; balanced modulator means coupled to receive said pulse signal and said carrier signal to balance-modulate said carrier signal with said pulse signal for producing a carrier-suppressed balanced modulated signal, the modulated carrier signal being substantially fully suppressed at a predetermined level traversed by the maximum gradient exhibited by said pulse signal but not at said at least two information levels; means for limiting said carrier-suppressed balanced modulated signal to not subtantially more than a single sideband; frequency converter means for converting the frequency band of said carrier-suppressed balanced modulated signal to a relatively lower band; and recording means for recording the frequency-converted, carrier-suppressed balanced modulated signal on said magnetic recording medium.

5. The apparatus of claim 4 wherein said pulse signal includes gradually rising and falling edges which exhibit said maximum gradient, and wherein said balanced modulator means has a modulation factor such that said carrier signal is substantially fully suppressed at said predetermined level when traversed by said rising and falling edges.

6. The apparatus of claim 5 wherein said modulation factor is greater than unity.

7. The apparatus of claim 5 wherein said means for limiting said carrier-suppressed balanced modulated signal to not substantially more than a single sideband comprises a vestigial sideband filter.

8. The apparatus of claim 7 wherein said vestigial sideband filter has a roll-off frequency characteristic that is reduced by 6 dB at the frequency of said carrier signal.

9. The apparatus of claim 4 wherein said frequency converter means comprises mixing means, and a source of conversion carrier; said mixing means being connected to mix said carrier-suppressed balanced modulated signal and said conversion carrier to produce a lower sideband of the mixed signals.

10. The apparatus of claim 4 wherein said recording means comprises a source of AC bias signal, a recording transducer, and means for supplying in superposed relationship said frequency-converted carrier-suppressed balanced modulated signal and said AC bias signal to said recording transducer.

11. Apparatus for recording information on a magnetic medium comprising a source of information; encoding means for representing said information as a pulse signal having rising and falling edges between at least two information levels which rising and falling edges exhibit a maximum gradient; a source of carrier signal; balanced modulator means coupled to balance-modulate said carrier signal with said pulse signal, said balanced modulator means having a modulation factor such that the modulated carrier signal is substantially fully suppressed when said rising and falling edges cross a predetermined level but not when said pulse signal is at said at least two information levels so as to produce a suppressed-carrier balanced modulated signal; vestigial sideband filter means for filtering said suppressed-carrier balanced modulated signal, said vestigial sideband filter means having a roll-off frequency characteristic that is reduced by 6 dB at the frequency of said carrier signal; a source of conversion carrier; frequency converting means coupled to said source of conversion carrier and to said vestigial sideband filter means to mix said filtered suppressed-carrier balanced modulated signal and said conversion carrier to produce a frequency-converted suppressed-carrier balanced modulated signal occupying a relatively lower frequency band; a source of AC bias signal; means for superimposing said AC bias signal and said frequency-converted suppressed-carrier balanced modulated signal; and a recording transducer for magnetically recording said superimposed signals on said magnetic medium.

12. The apparatus of claim 11 wherein the modulation factor of said balanced modulator means is greater than unity.

13. The apparatus of claim 11 further comprising means for reproducing said frequency-converted suppressed-carrier balanced modulated signal from said magnetic medium; frequency re-converting means for frequency re-converting the reproduced suppressed-carrier balanced modulated signal to its original frequency band; detecting means for detecting said pulse signal from said suppressed-carrier balanced modulated signal; and decoder means for decoding said information from said detected pulse signal.

14. The apparatus of claim 13 wherein said frequency re-converting means comprises a source of re-converting carrier, a first mixer for mixing said re-converting carrier with a carrier derived from the frequency re-converted suppressed-carrier balanced modulated signal to produce a re-converting signal, a second mixer for mixing said re-converting signal with said reproduced suppressed-carrier balanced modulated signal to provide said frequency re-converted suppressed-carrier balanced modulated signal and amplitude limiting means supplied with said frequency re-converted suppressed-carrier balanced modulated signal to drive said carrier therefrom and to supply said carrier to said first mixer.

15. The apparatus of claim 14 wherein said detecting means comprises multiplier means coupled to said second mixer and to said amplitude limiting means to multiply said frequency re-converted suppressed-carrier balanced modulated signal with said derived carrier to recover said pulse signal.

* * * * *